US007873072B2

(12) United States Patent
Kim et al.

(10) Patent No.: US 7,873,072 B2
(45) Date of Patent: Jan. 18, 2011

(54) SYSTEM AND METHOD FOR DIGITAL MULTIMEDIA BROADCASTING CONFINEMENT SERVICE

(75) Inventors: Han-Sang Kim, Suwon-si (KR); Kwan-Woong Song, Seoul (KR); Young-Hun Joo, Yongin-si (KR); Yong-Deok Kim, Seoul (KR); Yun-Je Oh, Yongin-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 453 days.

(21) Appl. No.: 11/636,932

(22) Filed: Dec. 11, 2006

(65) Prior Publication Data

US 2007/0183454 A1 Aug. 9, 2007

(30) Foreign Application Priority Data

Feb. 8, 2006 (KR) ...................... 10-2006-0012143

(51) Int. Cl.
*H04J 3/16* (2006.01)
(52) U.S. Cl. ........................ 370/466; 370/474; 370/486; 370/493
(58) Field of Classification Search ................. 370/466, 370/474, 476, 486, 493; 725/63, 106, 109, 725/118, 131, 139, 151
See application file for complete search history.

(56) References Cited

U.S. PATENT DOCUMENTS 7,184,652 B2 * 2/2007 Sugimoto et al. ............. 386/98

| | | | |
|---|---|---|---|
| 2003/0033613 A1 * | 2/2003 | Yoo et al. ................... 725/141 |
| 2003/0159139 A1 * | 8/2003 | Candelore et al. ............. 725/25 |
| 2004/0017831 A1 * | 1/2004 | Shen et al. ................... 370/486 |
| 2004/0261123 A1 * | 12/2004 | Yamada et al. .............. 725/131 |
| 2005/0091697 A1 * | 4/2005 | Tanaka et al. ............... 725/131 |
| 2006/0064760 A1 * | 3/2006 | Eyer ........................... 726/26 |
| 2007/0130590 A1 * | 6/2007 | Nash-Putnam ............... 725/63 |

FOREIGN PATENT DOCUMENTS

| KR | 2005-16722 | 2/2005 |
| KR | 2007-2962 | 1/2007 |

* cited by examiner

*Primary Examiner*—Jason E Mattis
*Assistant Examiner*—Kibrom T Hailu
(74) *Attorney, Agent, or Firm*—Cha & Reiter, LLC

(57) ABSTRACT

Disclosed are a system and method for providing digital multimedia broadcasting confinement service. The system includes: a relay center side system, which is adopted to the relay center, according to the relay center side packet identification description (PID) key, for modifying the PID of transport stream and generating the distorted program specific information (PSI); and a terminal side system, which is adopted to the DMB terminal, according to the terminal side PID key, for recovering the distorted PSI of the transport stream received from the relay center and decoding it. The method includes the steps of: identifying whether the actual PID of the TS is consistent when the TS is demultiplexed by audio/video PID acquired through the program map table (PMT) analysis of the TS; generating a preset alarm signal; modifying the PID of the audio/video data in the PMT according to the terminal side PID; and demultiplexing the TS according to the modified PID value.

7 Claims, 4 Drawing Sheets

| @ RELAY CENTER | | |
|---|---|---|
| BEFORE | AFTER | |
| 287 | 422 | 287 |
| ⋮ | ⋮ | ⋮ |
| 450 | 863 | 450 |
| ⋮ | ⋮ | ⋮ |
| 176 | 1364 | 176 |
| ⋮ | ⋮ | ⋮ |
| 690 | 1563 | 690 |
| | BEFORE | AFTER |
| | @ TERMINAL | |

SYSTEM AND METHOD FOR DIGITAL MULTIMEDIA BROADCASTING CONFINEMENT SERVICE

CLAIM OF PRIORITY

This application claims priority to an application entitled "System And Method For Digital Multimedia Broadcasting Confinement Service," filed with the Korean Intellectual Property Office on Feb. 8, 2006 and assigned Serial No. 2006-12143, the contents of which are incorporated herein by reference.

BACKGROUND OF THE INVENTION

1. Field of the Invention

The present invention relates to a digital multimedia broadcasting (DMB) service, and more particularly to system and method for providing the DMB confinement service.

2. Description of the Related Art

DMB service involves multiplexing digital broadcasting data corresponding to a plurality of programs compressed by a high-efficiency compression algorithm, for example, moving picture expert group (MPEG), then broadcasting through a satellite or terrestrial relay center via digital broadcast waves. Thus, it enables users to receive the data through a portable receiver or vehicle receiver. The digital broadcasting data is separated into video and audio data etc. to be compressed, divided into the transport packets (TP) of a designated unit, and multiplexed into a transport stream (TS) to be transmitted. The digital broadcasting data is multiplexed in each TS, so that a user can select and watch a desired program.

With the DMB service, the satellite DMB service became a charged service. Unlike the general TV broadcasting that emits the broadcasting to a majority, the satellite DMB service emits the broadcasting programs only to authorized subscribers and contains a conditional access system (CAS) for blocking unauthorized users.

FIG. 1 shows a configuration of the conventional digital multimedia broadcasting receiver, which includes an antenna 10, a DMB receiving module 20, a decoder module 30, a display unit 50, and a speaker 60. A confinement receiver 33, which confines the broadcasting reception, is employed in the decoder module 30. The construction of the digital multimedia broadcasting receiver shown in FIG. 1 may be applied to a mobile terminal.

In operation, the digital broadcasting signal received through the antenna 10 is reproduced into the original TS in the demodulator 21 of the DMB receiving module 20, the reproduced TS is corrected by the forward error correction (FEC) unit 23, and then input to the decoder module 30. A TS demultiplexer 31 demultiplexes the TS in which digital broadcasting data of a plurality of programs is multiplexed. The decoder module 30 extracts the TP that includes the digital broadcasting data of programs selected by users. Then, the digital broadcasting data is scrambled, that is, encrypted to be transmitted for the purpose of confinement reception. The CAS 33 of the decoder module 30, for example, descrambles, that is, decodes the encrypted digital broadcasting data using the scrambling key generated from a smart card 40. The decrypted digital broadcasting data is decoded in both an MPEG video decoder 35 and an MPEG audio decoder 37 of decoder module 30 to be supplied to users through both the display unit 50 and speaker 60.

Transport streams (TSs) have been considered only when program specific information (PSI) has an accurate packet identification description (PID) value of an audio/video elementary stream (ES) and demultiplexed with the audio/video ES. Since the PSI has an accurate PID value of audio/video ES, it is unsuitable to provide a free and/or charged multimedia service according to channels at the same time. Accordingly, the additional devices for authentication and copy guard, such as the CAS 33, are required. As a result, the configuration of the conventional DMB receiver is complicated, and additional cost is increased.

SUMMARY OF THE INVENTION

The present invention provides a system and method for providing digital multimedia broadcasting confinement service using a simpler construction and at low cost.

According to one aspect of the present invention, there is provided a system for digital multimedia broadcasting (DMB) confinement service, which includes: a relay center side system, which is adopted to the relay center taking charge of the relay network relaying the DMB signals, according to the preset relay center side packet identification description (PID) key, for modifying the PID of a transport stream, and for generating the distorted program specific information (PSI); and a terminal side system, which is adopted to the DMB terminal receiving the DMB service, according to the preset terminal side PID key, for recovering the distorted PSI of the transport stream received from the relay center and decoding it.

According to another aspect of the present invention, there is provided a method for performing the DMB confinement service, when the DMB terminal receiving DMB service by possessing the preset terminal side PID key decodes the TS of receiving DMB signals, which includes the steps of: identifying whether the actual PID of the TS is consistent when the TS is demultiplexed by audio/video PID acquired through the program map table (PMT) analysis of the TS; generating the preset alarm signal when the actual PID of the TS is not consistent; modifying the PID of the audio/video data in the PMT according to the terminal side PID key when the alarm signal is generated; and demultiplexing the TS according to the modified PID value.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings. The detailed description of the structural elements only is disclosed to help in understanding the present invention overall. It is obvious to those skilled in the art that the structural elements may be changed or modified within the scope of the present invention.

Figure 1:
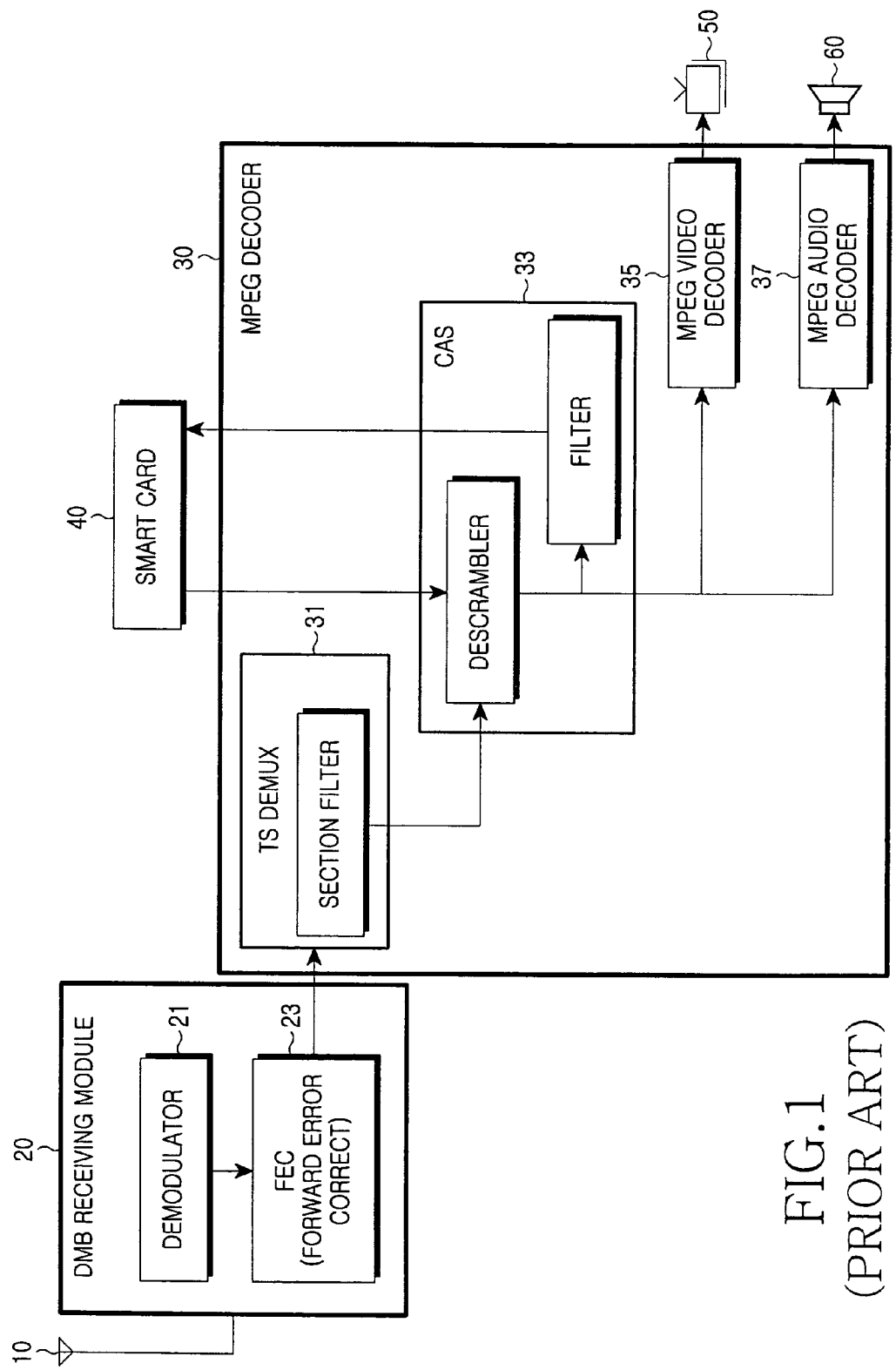
FIG. 1 illustrates a configuration of a conventional digital multimedia broadcasting receiver.
Figure 2:
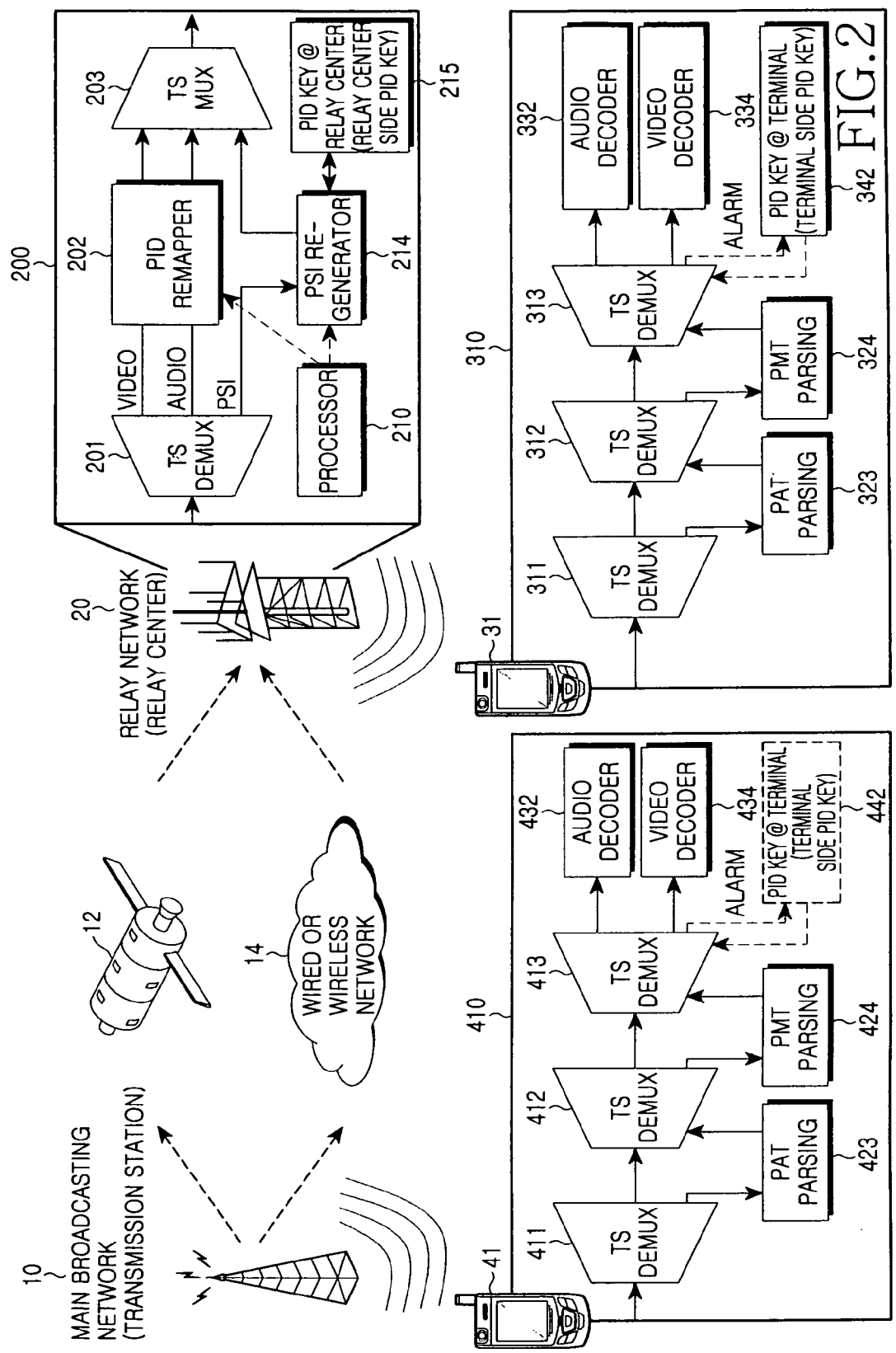
FIG. 2 is a block diagram illustrating in outline a system for digital multimedia broadcasting confinement service according to an embodiment of the present invention.

FIG. 2 is a block diagram illustrating a system for providing a digital multimedia broadcasting confinement service according to an embodiment of the present invention. As shown, in a DMB service network, a main broadcasting network (transmitting center) 10 emits the DMB broadcasting signals in the wired/wireless way. The broadcasting signals may be received by the second DMB terminal 41 or by a relay center 20 via satellite 12 and wired/wireless network and are supplied to the first DMB terminal.

Generally, in order to provide the discriminative broadcasting service, all users must be able to listen to the broadcasting for free when both the free and charged channels coexist. The user who subscribes to pay service through the relay center must be able to view the charged channel, and the existing free general broadcasting service must be used as it is in the main broadcasting network 10. That is, a viewer must be able to watch through the main broadcasting network 10 even though the viewer does not subscribe. A broadcasting company/mobile communication company, which won't participate in the relay network business, must be able to use the corresponding broadcasting service in the main broadcasting network.

In FIG. 2, the terminal receiving the charged DMB broadcasting by way of the relay center 20 is referred to as the first DMB 31 terminal, and the terminal receiving the free DMB broadcasting directly from a main broadcasting network is referred to as the second DMB terminal 41.

Referring to FIG. 2, the DMB confinement system according to the present invention may be generally classified into a relay center side system 200 (PID scramble module) of the relay center 20 in charge of the relay network, and a terminal side system (decoder module) 310, 410 adopted to the first and second DMB terminals. The relay network side system 200, according to the teachings of the present invention, changes the PID with a preset PID key at random continuously, generates the distorted PSI to preclude the second terminal 41 from decoding the TS in general way. The terminal side system 310 in the first DMB terminal 31, which is in a possession of the terminal side PID key, recovers the distorted PSI with the preset PID to make it possible to decode the received TS normally. That is, the present invention provides a confinement reception through the scramble in the level of TS by distorting the PID value, thus eliminating the need for the CAS.

The relay center 20 further includes a receiving module (not shown) that receives and decodes the DMB signal to the original TS so as to provide the original TS to the corresponding relay center side system 200, and a transmitting module (not shown here) that wirelessly transmits the TS output from the relay center side system 200. However, these modules are omitted in FIG. 2 for the convenience of explanation. Furthermore, the first and second DMB terminal 31 and 41 are provided with the receiving module for receiving the DMB broadcasting signal. However, the receiving module is omitted in FIG. 2 for the convenience of explanation.

The relay center side system 200 adopted to the relay center 20 includes a TS demultiplexer (TS Demux) 201, a TS multiplexer (TS Mux) 203, a PID remapper 202, a PSI regenerator 214, Processor 210, and a relay center side PID key (PID key @ relay center) 215.

The TS Demux 201 plays a role of extracting the audio data, video data and PSI data by demultiplexing the TS. The PID remapper 202 modifies the PID of audio/video data under the control of the processor 210. The PSI regenerator changes the original PID value of audio/video in PMT into the appropriate corresponding PID by using the PID key @ relay center 215, i.e. PID conversion table. The TS Mux 203 multiplexes again the audio/video data output from the PID remapper 202 and the PSI data output from the PSI regenerator 214. The processor 210 controls the PID remapper 202 and PSI regenerator 214 in order to generate a random PID at random time. At this time, different PIDs are generated for the purpose of avoiding a collision of PIDs.

The terminal side system 310 adopted to the first DMB terminal 31 contains not only the first, second and third TS Demuxes 311, 312 and 313, which are in the existing decoder module, audio decoder 332, and video decoder 334 but also the terminal side PID key (PID key @terminal) 342.

If the TS is input into the first Demux 311, the first Demux 311 in the first DMB terminal 31 acquires the program association table (PAT) among TSs to provide it for PAT parsing unit 323, and the PAT parsing unit 323 acquires the PID information of the PMT TS containing the PID information of each program channel. The second Demux 312 acquires PMT TS on the basis of the PID information of the PMT TS of the PAT parsing unit 323 to provide it for PMT parsing unit 324. The PMT parsing unit 324 acquires the PID information of the TS containing the video, audio and program clock reference (PCR) data of each single program transport stream (SPTS) from the PMT TS mentioned above to generate the PMT table. On the basis of the information of the PMT parsing unit 324, the third Demux 313 generates and outputs each SPTS to the audio decoder 332 and the video decoder 334.

The third Demux 313 converts again the audio and video PID value in the PMT by using the terminal side PID key 342, i.e., PID conversion table to recover the original PID value of audio and video on the basis of the values, and generates the SPTS. That is, the PID key is retained in the relay center 20 and the first DMB terminal 31 respectively, and shares the common PID conversion table (for example, the order of conversion may be represented by x→y→x.). Accordingly, if the received PID value of audio/video data by relay center 20 is x, the corresponding PID value is converted into y by the PID key @ relay center 215 and is transmitted. The first DMB terminal 31 converts again the received PID value, i.e., y into x by using the terminal side PID key 242.

Meanwhile, the second DMB terminal 41 similarly contains the first, second and third TS Demux 411, 412 and 413, an audio decoder 432 and a video decoder 434, and is able to decode the normal audio and video signal without regard to retention of the PID key of the terminal because there is no distortion of the TS transmitted from the main broadcasting network.

If the decoding process of the TS in the existing DMB is performed in the terminal in order of PAT parsing, PMT parsing, and audio/video decoding, the following steps should be inserted between the PMT parsing and audio/video decoding in the process of TS decoding of the present invention. It may be called the steps of 'unknown PID identification', 'Alarm', and 'PID conversion'. The step of unknown PID identification is the a step for identifying the inconsistency of the PID of the TS input in spite of demultiplexing the TS with audio/video PID acquired from the PMT parsing, the step of alarm is for generating the alarm signal according to the result of the step of unknown PID identification, and the step of PID conversion is for inputting the PID value of the audio/video in PMT into the terminal side PID key 342 to convert the PID value under the alarm signal. Then, demultiplexing the TS is tried again according to the converted PID value by the terminal side PID key 342. Here, if the terminal side PID key is not prepared or invalid, it is not possible to decode the TS normally.

Figures 3, 4:
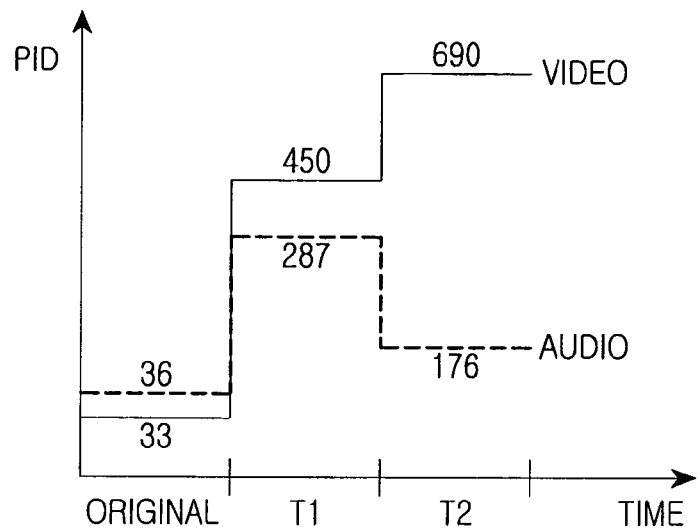
FIG. 3 is a view illustrating a modification of the audio/video PID in a relay center in FIG. 2 according to time.
FIG. 4 is a conversion table of a relay center and a PID key of a DMB terminal in FIG. 2.

FIG. 3 is a view illustrating a modification of the audio/video PID in the relay center 20 of FIG. 2 according to time, in which the conversion of PID is changed randomly according to the present invention. For example, as illustrated in FIG. 3, if the initial PID of audio/video data received from the main broadcasting network 10 are 36 and 33 respectively, that is to say, [video PID, Audio PID]=[33, 36], it may be changed into [450, 287] at T1 time, and [690, 176] at T2 time. The length of the T1 and T2 time may be random. Accordingly, since there is no way of forecasting the PID value of a specific channel in the usual DMB terminal, it is impossible to perform the audio/video decoding. The random time setup like T1, T2 time may be accomplished by the result of calculating appropriate time function prepared with the same construction between the relay center and the terminal, respectively. Namely, the audio/video PID in PMT and the PID of the audio/video of the actual TS is changed in the relay network every random time. The terminal, if it is impossible to decode, recognizes that the audio/video PID has been changed with the alarm signal, and then decodes the audio/video PID value by replacing the audio/video PID value on reference to the PID key in the terminal. At this time, even though the time spent on recognition of impossibility of decoding and replacement of the PID in PMT is extremely short, the obstacles, such as a pause of pictorial image, may be caused. Thus, in order to resolve the problem, if a time function corresponding to each PID value is shared with the relay center and the terminal, it is possible to forecast the time of impossibility of decoding, and accordingly, the obstacles may be overcome. At this time, the used time function, for example, may be a following equation (1).

$$f(x)=a_n x^n + a_1 x^{(n-1)} + \ldots + a_{n-1} x + a_n \quad \text{Equation (1)}$$

wherein the constants like $a_0, a_1, \ldots a_{n-1}, a_n$ must be set in order to make the f(x) value be positive for all PID value x since the audio/video PID values can take another f(x) value. The method for selecting one of two values must also be defined as the example described in the following equation (2).

$$\text{time duration} = \max[f(\text{video PID}), f(\text{audio PID})] \quad \text{Equation (2)}$$

Note that the equation (2) is used for selecting the larger value out of two values.

FIG. 4 is a view illustrating the operation of a conversion table by the relay center and a PID key of the DMB terminal of FIG. 2. As described above, the relay center and the DMB terminal share a PID conversion table. The relay center converts PID into a form of x→y, and the terminal converts PID into a form of y→x. In FIG. 4, there is an example for applying equally the PID conversion table made in a simple two-dimensional way, irrespective of time. However, according to the embodiment of the present invention, there may be a constructed three-dimensional conversion table, including the time base, supplementarily, in order to take a different converted value according to T1, T2 time and the like. The conversion table illustrated in FIG. 4, for instance, may correspond to the T1 time as the video PID is 450 and the audio PID is 287, the relay center converts the corresponding video PID into 863 and corresponding audio PID into 422 to regenerate the PMT TS.

Since the DMB terminal converts the audio/video PID values, that is, the video PID value of 863, the audio PID value of 422 in to the PMT information of 450 and 287, respectively, using the terminal side PID key through the steps of unknown PID identification and alarm, the DMB terminal demultiplexes and decodes the audio/video data.

Figure 5:
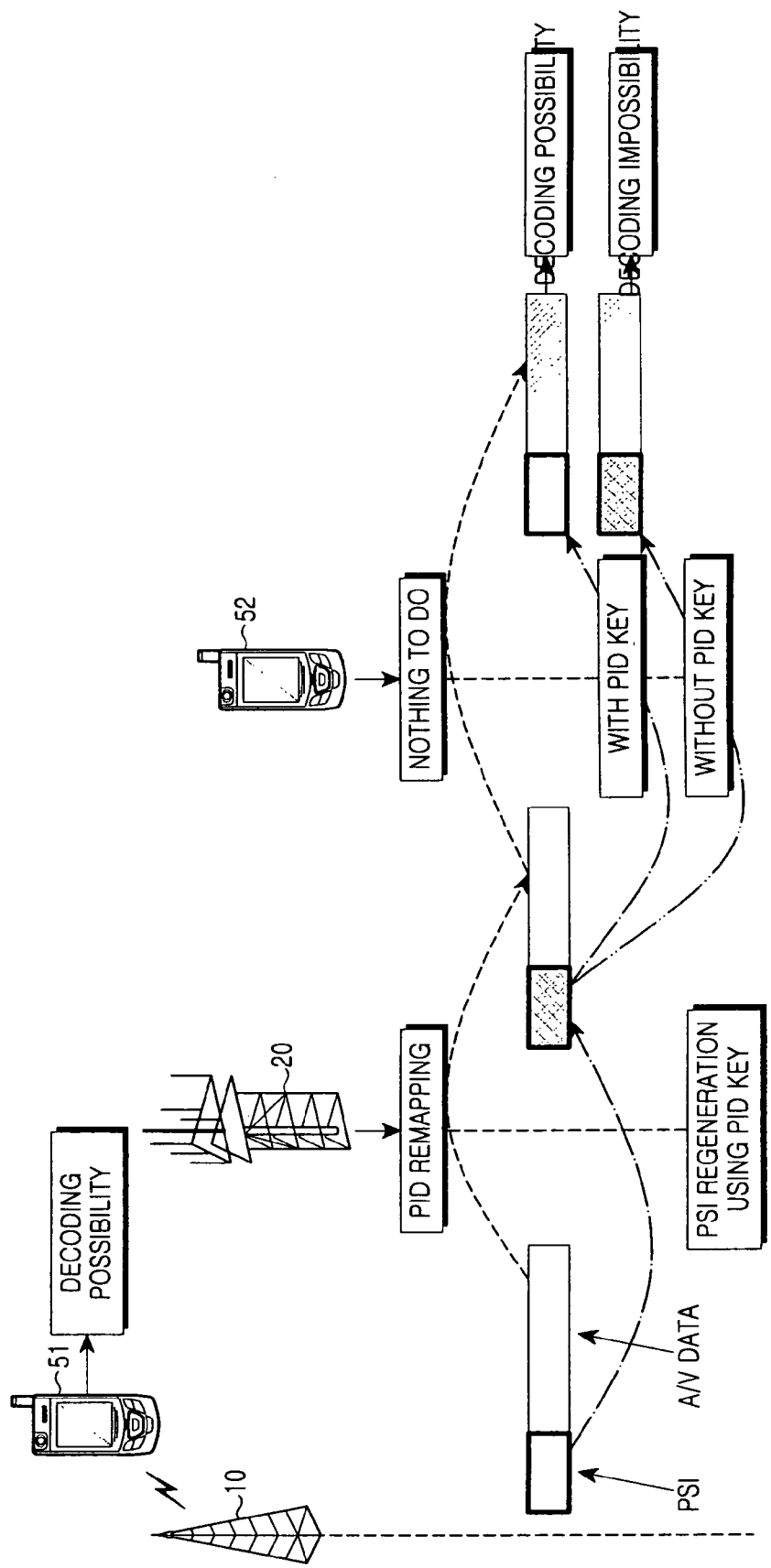
FIG. 5 is a view illustrating an outline an overall operation among devices for broadcasting reception.

FIG. 5 is a view illustrating an overall operation according to the present invention. As shown, as the PSI, which exists in the audio/video stream (audio/video data+PSI, hereinafter, transport stream) generated early in the transmitting station 10, has accurate information on the PID, all the DMB terminals 51, which are in the main broadcasting network receiving the transport stream generated from the transmitting station 10, are able to decode the audio/video data normally.

Meanwhile, the relay center 20 receives the transport stream generated from the transmitting station 10 and retransmits the transport stream by regenerating PSI and PID remapping the audio/video data.

Since the DMB terminal 52 in the relay network receives both audio/video data having an hourly changeable PID value and distorted PSI, if the terminal side PID key is not prepared, the DMB terminal 52 is not able to decode the converted transport stream 512. However, if the terminal side PID key is prepared, the DMB terminal 52 is able to decode the transport stream 512 by modifying the distorted PID information in the PSI.

The following Table 1 shows the operations status in FIG. 5, for example the PID conversion status in T1 and T2 time zones.

TABLE 1

|  |  | relay center | a DMB terminal without PID key | | a DMB terminal with PID key | |
|---|---|---|---|---|---|---|
|  | PID | Original | T1 | T2 | T1 | T2 |
| PSI | PAT PID | 0 | 0 | 0 | 0 | 0 | 0 |
|  | PAT PID | 16 | 16 | 16 | 16 | 16 | 16 |
| in PMT | Video PID | 33 | 863 | 1563 | 863 | 1563 | 863→450 | 1563→690 |
|  | Audio PID | 36 | 422 | 1364 | 422 | 1364 | 422→287 | 1364→176 |
| Real TS | Video PID | 33 | 450 | 690 | 450 | 690 | 450 | 690 |
|  | Audio PID | 36 | 287 | 176 | 287 | 176 | 287 | 176 |
|  | possibility of A/V Decoding | ○ | X | X | X | X | X→○ | X→○ |

Referring to Table 1, the PID of PAT and PMT is never changed under any situation. However, the audio/video PID value is changed at random according to time, and the information on the audio/video PID in PMT is changed by the relay center side PID key at the relay center into the PID value corresponding to the audio/video PID in actual transport stream. If there is no terminal side PID key because the audio/video PID in the actual transport stream and PID information in PMT are distorted, it is impossible to decode the PID information in a DMB terminal. However, if there is a terminal side PID key, the PID information in PMT is converted by the terminal side PID key, audio/video PID information in actual transport stream is obtained by the terminal, and it is possible to decode the PID information.

As described above, according to the present invention, in the case where a DMB terminal does not have the PID key shared with a relay center, there is no means of decoding even a program, which may be decoded in the main broadcasting network, if the program is received by the relay network. The PID value of the stream that a relay center sends is changeable at random, even if the PID value of the audio/video data at specific time is found out, and the continuous viewing is not possible without valid PID value, thus the scrambling effect is obtainable. Therefore, the method for digital multimedia broadcasting confinement service according to the present invention provides discriminative broadcasting service between a main broadcasting network and a relay network at low cost. Further, since it is unnecessary for the method to use an additional header, which may be needed generally in the method for distinguishing a main broadcasting network and a relay network, the overhead of data is not incremental, thus the inventive method has the advantage of keeping the quantity of transmitting data as it is.

The main broadcasting network and the relay network are only examples of the specific network for describing the present invention, and the present invention may also be applied to the systems for a charged multimedia service. Accordingly, the present invention may be applied by replacing the main broadcasting network (transmitting station) with a main region or a main server, and a relay network (relay center) with a local region or a local server. In addition, the present invention may also be applied to internet protocol television (IPTV) service and network information system (NIS).

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for digital multimedia service including a relay center side that relays information to a terminal side, said system comprising:
    on the relay center side, a relay center incorporated in a relay network relaying the digital multimedia signals according to a predetermined relay center side packet identification description (PID) key, modifying a PID value of an audio and/or video data of a transport stream to obtain a modified PID value of the audio and/or video data of the transport stream, and generating a modified program specific information (PSI) by modifying an audio and/or video PID value and storing in a program map table (PMT) to obtain a modified audio and/or video PID value in the PMT;
    on the terminal side, a terminal receiving the digital multimedia service and demultiplexing the received digital multimedia service and for decoding in accordance with a preset terminal side PID key, said terminal recovering the modified PSI of the transport stream received from the relay center by utilizing the terminal side PID key, and decoding the transport stream (TS) including the audio and/or video data having the modified PID; and
    wherein, on the relay side, the modified audio and/or video PID value stored in the PMT does not match the modified PID of the audio and/or video data of the transport stream.

2. The system as claimed in claim 1, wherein the relay center comprises:
    a demultiplexer for demultiplexing the relayed transport stream and extracting audio and/or video data and PSI data from the demultiplexed transport stream;
    a remapper for modifying the PID of the extracted audio and/or video data;
    a PSI regenerator for changing the original PID value stored in the program map table (PMT) of the PSI using the relay center side PID key;
    a transport stream (TS) Mux for multiplexing the audio and/or video data output from the PID remapper and the PSI data output from the PSI regenerator; and
    a processor for controlling the operations of the PID remapper and PSI regenerator.

3. The system as claimed in claim 1, wherein the relay center modifies the PID value of the audio and/or video data and generates the modified PSI using the relay center side PID key according to the time zones generated by a predetermined time function, and wherein the terminal recovers the modified PSI of TS received from the relay center using the terminal side PID key according to the time zones generated by the predetermined time function, so as to decode the recovered TS.

4. The system as claimed in claim 1, wherein the modified PSI precludes another terminal from decoding the TS.

5. The system as claimed in claim 1, wherein the relay network continuously changes the digital multimedia signals according to the predetermined relay center side packet identification description (PID) key at random.

6. A method for performing a digital multimedia service, in which a digital multimedia terminal on a terminal side, which receives digital multimedia service from a relay center side by possessing a predetermined terminal side packet identification (PID) key, decodes the transport stream (TS) of receiving digital multimedia signals, and a modified PID value of audio and/or video data (audio and/or video PID) modified by a relay center and a modified program specific information (PSI) generated by the relay center included in the received transport stream (TS) of the digital multimedia signals, the method comprising the steps of:
    identifying if a value of an actual PID of the TS corresponds with an audio and/or video PID value acquired by analyzing a program map table (PMT) of the TS when the TS is demultiplexed according to audio and/or video PID acquired by analyzing the PMT of the TS;
    generating a predetermined alarm signal when the actual PID of the TS does not match the value of the audio and/or video PID value acquired by analyzing the PMT of TS;
    modifying the audio and/or video PID value in the PMT according to a predetermined terminal side PID key when the alarm signal is generated;
    demultiplexing the TS according to the audio and/or video modified PID value; and wherein, on the relay center, an audio and/or video PID value stored in the modified PSI does not match the modified PID of the audio and/or video data.

7. The method as claimed in claim 6, wherein the terminal side PID key is a two-dimensional conversion table storing the PID value including before and after conversion, or a three-dimensional conversion table including the time base supplementarily in order to take a different converted value according to the predetermined time zone.

* * * * *

UNITED STATES PATENT AND TRADEMARK OFFICE
CERTIFICATE OF CORRECTION

| | | |
|---|---|---|
| PATENT NO. | : 7,873,072 B2 | |
| APPLICATION NO. | : 11/636932 | |
| DATED | : January 18, 2011 | |
| INVENTOR(S) | : Han-Sang Kim et al. | |

It is certified that error appears in the above-identified patent and that said Letters Patent is hereby corrected as shown below:

Column 8, Claim 6, Line 65 should read as follows:
--...when the alarm SIGNAL is generated.--

Signed and Sealed this
Fifth Day of April, 2011

David J. Kappos
*Director of the United States Patent and Trademark Office*